Oct. 26, 1965  P. L. MAY ETAL  3,213,783
HAY PELLETIZER
Original Filed May 2, 1958  3 Sheets-Sheet 3
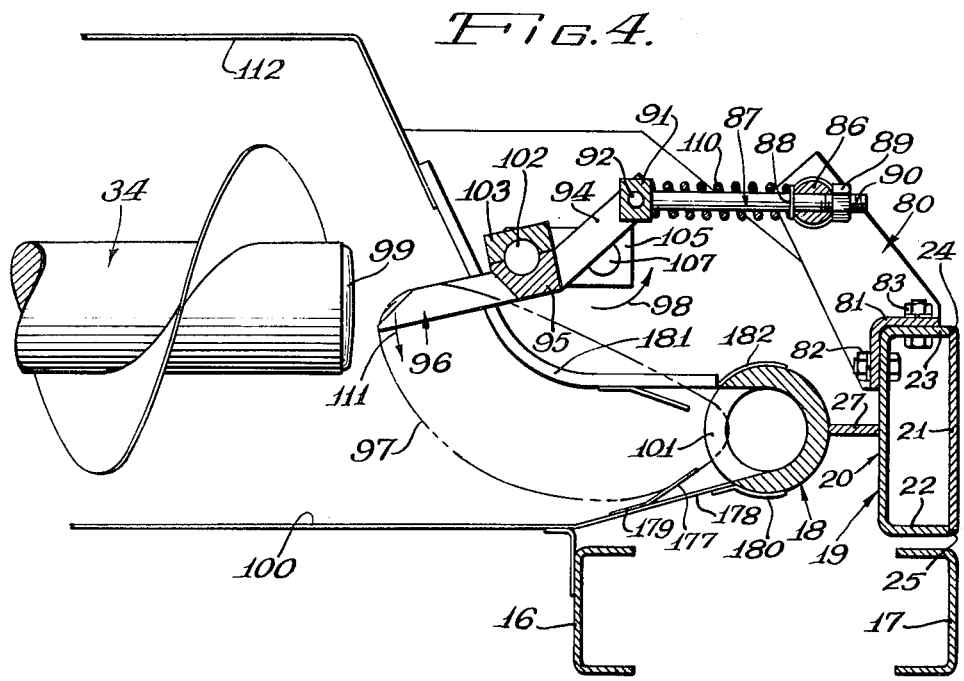
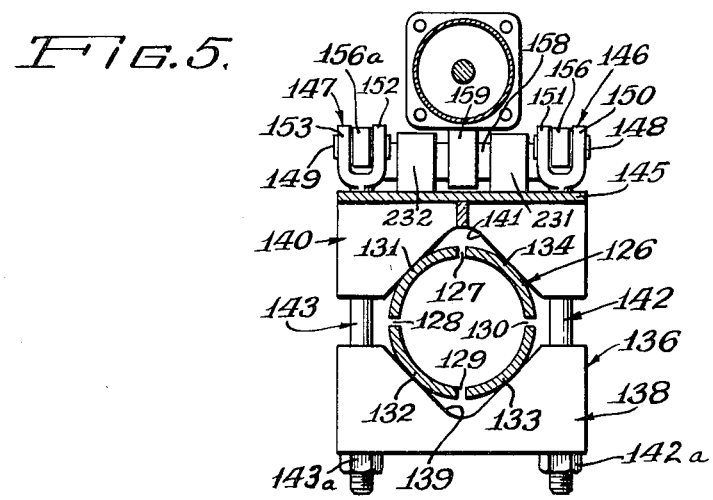
INVENTORS:
Patrick L. May
William K. Ralston United States Patent Office 3,213,783
Patented Oct. 26, 1965

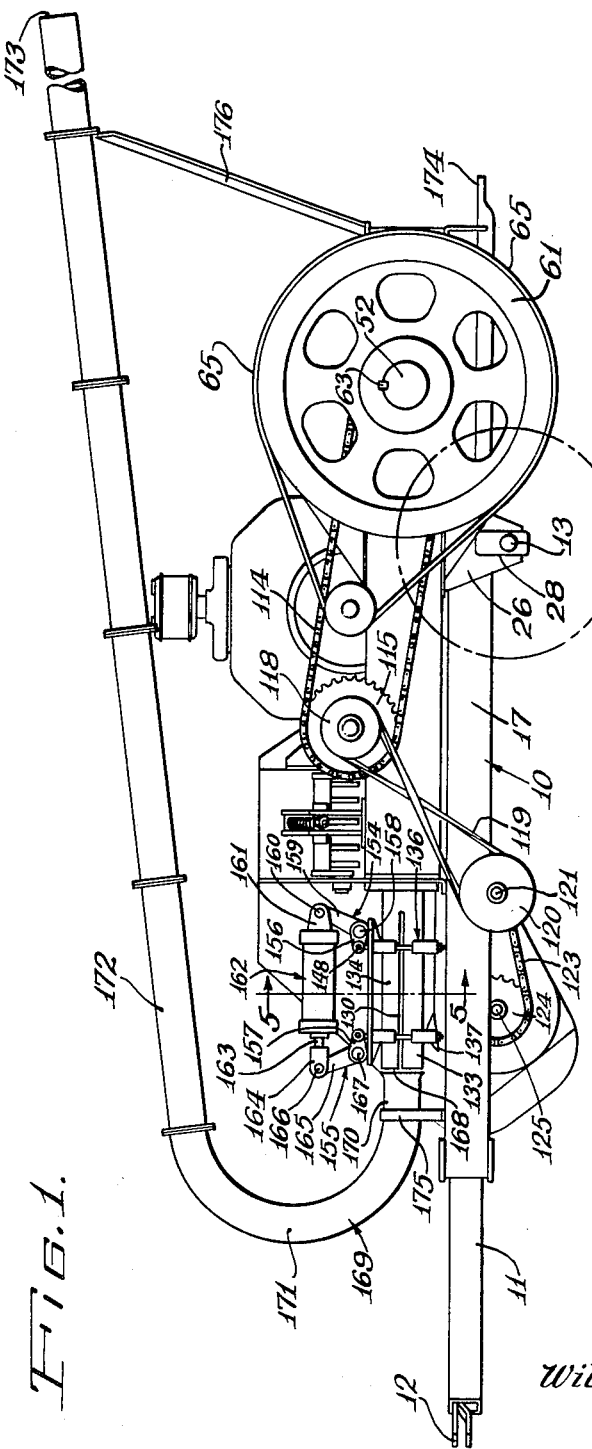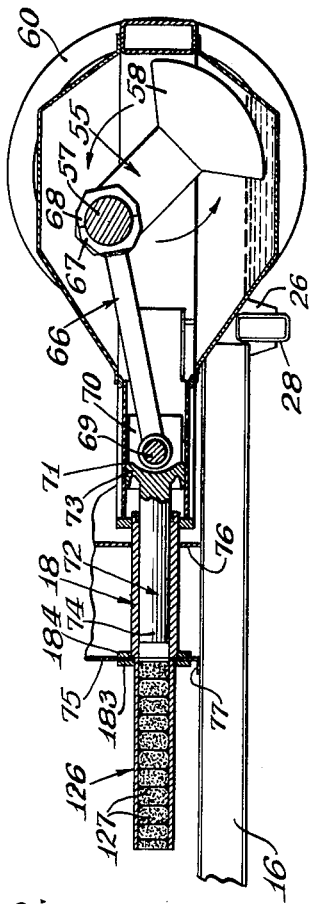

3,213,783
HAY PELLETIZER
Patrick L. May and William K. Ralston, Memphis, Tenn., assignors to International Harvester Company, Chicago, Ill., a corporation of New Jersey
Continuation of application Ser. No. 106,091, Apr. 27, 1961, which is a division of application Ser. No. 732,731, May 2, 1958. This application Sept. 24, 1962, Ser. No. 225,817
15 Claims. (Cl. 100—100)

This invention relates to a new and improved machine for making hay pellets and is a continuation of our co-pending application entitled "Method of Making Hay Pellets," Serial No. 106,091, filed April 27, 1961, and now abandoned, which in turn is a division of our earlier application entitled "Field Pellet Press," Serial No. 732,731, filed May 2, 1958, and now abandoned.

Farming and farming practices are undergoing constant change. Some of the major changes have occurred in the handling and feeding of hay crops. Initially the use of hay was by admitting the stock to be fed to the field of growing hay whereupon the stock would feed on the hay plant and with this procedure there is no storage problem. Of course, this practice continues and probably will always continue to some extent in the feeding of animals. However, during non-growing seasons, it has been and continues to be a problem to effectively store the hay from the time it is cut to the time it is fed to the animals. The first step, of course, was to cut the hay and thereafter gather it in a loose mass and deposit it in a mow in a barn or the like. Such a procedure required the maintenance of a large costly barn and the storage of dry hay therein create certain hazards such as, for example, a fire hazard. In more recent years it has been found desirable to compress the hay in bale form and, in this state of compression, store the hay for future use. This procedure substantially reduced the required storage space making the storing more economical and at the same time making it easier to handle. With each change in procedure new machines were required to facilitate handling and treatment of the hay crop. Hay balers have progressed from relatively crude difficult to operate machines to very highly efficient one-man operated automatic balers. Now, a further change in the handling procedures for a hay crop is being contemplated, and these new proposed handling procedures involve the compressing of hay by forces substantially in excess of those compressing forces used in the presently known balers. This, of course, further reduces the storage space requirements and produces hay having substantially different characteristics than loose hay or baled hay. Obviously, the most noticeable or apparent physical difference is the hardness of the highly compressed hay. The density of the highly compressed hay is so great that the weight per unit volume is substantially in excess of loose or ordinary baled hay and thus the formed bale must of necessity be made considerably smaller in order to handle it. It is proposed that the highly compressed hay be made in small pellets such that an animal may readily eat the pellet without the user preliminarily breaking up the pellets for eating by the animal. There is thus involved a new concept in the handling and feeding of hay.

A principal object of the present invention is to provide a means for making hay pellets.

An important object of this invention is the provision of means for subjecting quantities of harvested hay to high pressures and thereby form hay pellets such that the hay will remain compressed in its formed shape without auxiliary binder mediums.

Another important object of this invention is to provide a hay pelleting machine wherein hay is extruded under high pressures through a restricted passage to cause the natural juices within the hay to come to the surface of the pellet where they are subjected to the heat of friction so that the juices are in effect baked to form a pellet with a hard crusty outer surface.

Another and still further important object of this invention is to provide a means for compacting hay under high pressures wherein the hay is picked up after having been previously cut, and without comminuting the hay other than to sever the connection between successive charges, to compress the hay under high pressure within a tubular housing to an extent where the heat of friction with the internal walls of the tubular housing causes the external surface of the formed pellets to be glazed and thereby hold the hay in pellet formation without added binders or encircling strands.

Still another object of the invention is the provision of a novel pelletizer structure in which certain heavier components, including an engine and a pellet-forming apparatus, are located at the rear of the pelletizer and the hay charges are driven forwardly during compaction, in the direction of pelletizer travel.

A corollary object of the invention is the provision of novel elevator means which both receives the formed pellets traveling forwardly from the pelletizer and directs the pellets upwardly and rearwardly toward a suitable depository, the length of travel of the pellets being such that the frictional forces produced generate heat which forms a glaze or baked crust on the outer surfaces of the pellets.

Other and further important objects and advantages will become apparent from the disclosure in the following specification and accompanying drawings, in which:

FIGURE 1 is a side elevational view of the field hay pelletizer of this invention;

FIGURE 2 is an enlarged detailed partial sectional view of the hay compressing mechanism as taken on the line 2—2 of FIGURE 3;

FIGURE 4 is a sectional view taken on the line 4—4 of FIGURE 3; and

FIGURE 5 is an enlarged sectional view taken on the line 5—5 of FIGURE 1.

Figure 3:
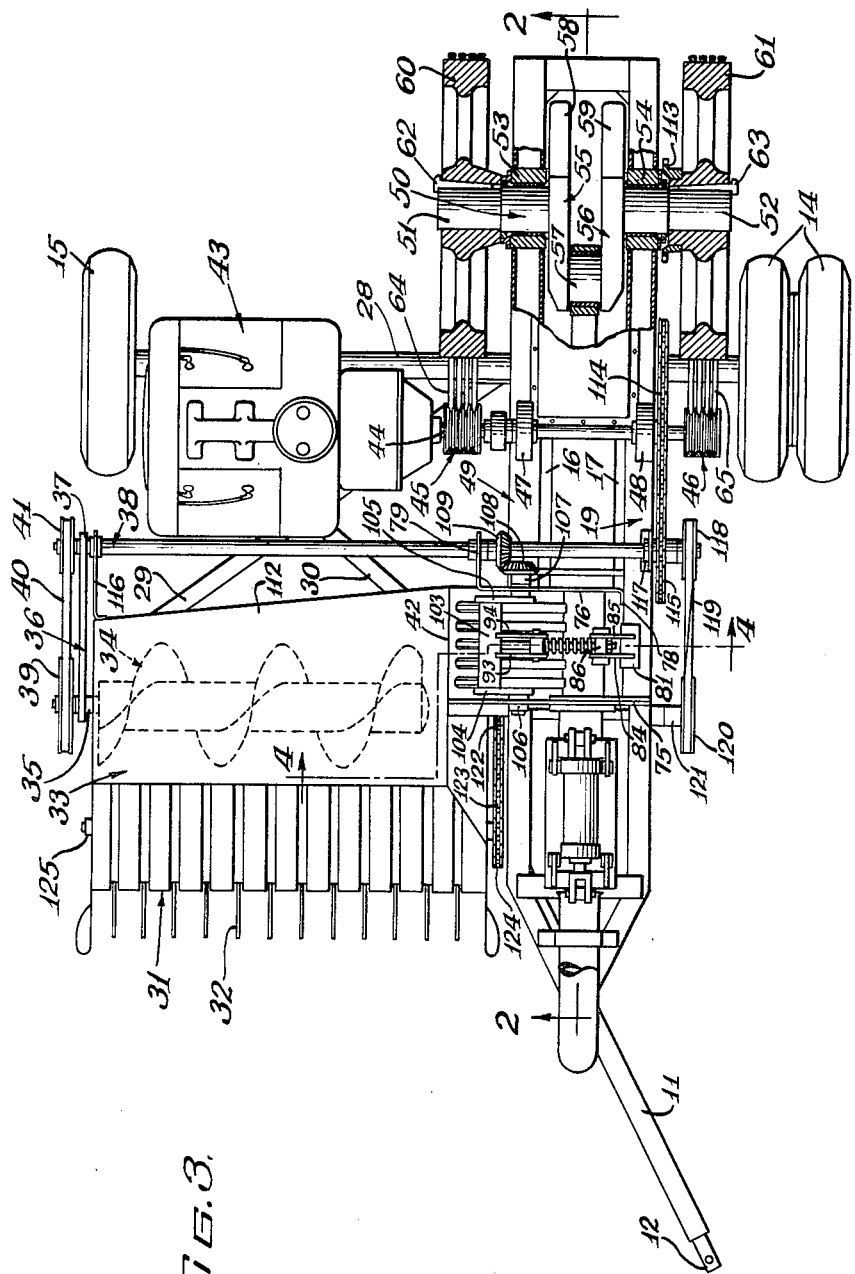
FIGURE 3 is a top plan view of the pelletizer of FIGURE 1.

As shown in the drawings, the reference numeral 10 indicates generally a frame supporting structure extending in a generally longitudinal direction. The forward end of the frame structure 10 is provided with a swinging tongue 11 having a hitch or clevis member 12 at its forward end for fastening to a tractor drawbar or the like (not shown). The rearward end of the frame structure 10 is provided with a wheel truck or the like having a cross shaft or axle 13, a pair of wheels 14 at one side thereof, and a spaced-apart wheel 15 at the other side thereof. It is thus apparent that the major part of the load of this field traversing pelletizing machine is carried about the wheel truck at the rear or adjacent the rear of the frame structure 10. This, of course, eliminates great loads imposed on the pulling tractor and makes it possible to substantially balance the machine about the rearwardly disposed wheel truck.

The frame structure 10 includes inwardly facing open channel members 16 and 17 disposed generally beneath the pellet forming tube 18 as shown in FIGURE 4. The frame supporting structure 10 also includes a generally longitudinally disposed fabricated beam 19 positioned above the channel member 17 and disposed also to the right of the pellet making tube 18, all as viewed in FIGURE 4. The fabricated beam comprises a channel member 20 and an enclosure plate 21 which is welded or otherwise fastened to the laterally projecting legs 22 and 23 of the channel member 20. Welding seams 24 and 25 are shown in FIGURE 4 to complete the fabricated beam 19. As shown in FIGURE 1, the fabricated beam 19 is supported on the axle 13 by a bracket member 26 which is fastened to the outside of the channel member 17 and thence to the underside of the beam 19. The pellet chamber or tube 18 is held in spaced relationship to the tubular beam 19 by a spacing plate member 27 as shown in FIGURE 4. As shown in FIGURES 1, 2 and 3, the axle 13 carrying the supporting wheels 14 and 15 is enclosed within a rectangularly-shaped torque tube 28 which distributes the load carried by the implement across the full width of the machine. An X-shaped frame consists of cross members 29 and 30 extending laterally to one side of the channel member 16 and carried at their rearward ends integrally with the torque tube 28. Thus all of the frame members including the channels 16 and 17, the fabricated beam member 19, the plate member 27, the torque tube 28 and its unitary bracket 26, along with the X-frame 29 and 30 constitute the frame supporting structure 10 of this field traversing pelletizing machine.

The laterally extending X-frame 29–30 carries a hay pickup mechanism including a rotary pickup cylinder 31 at the forward end thereof having a plurality of spring fingers 32 arranged and constructed to pick hay up and throw it over and rearwardly to a deck or platform 33 whereupon hay so gathered and harvested is moved laterally across the platform 33 by means of an auger conveyor 34. The auger conveyor is carried on shaft 35 which is supported in an arm 36 hingedly mounted at 37 to a cross shaft 38. The auger shaft 35 is provided with a V-pulley 39 at the outer end thereof beyond the carrying arm 36. A V-belt 40 is adapted to engage the V-pulley 9 and V-pulley 41 mounted on the outer end of the cross shaft 38. It will thus be apparent that rotational drive is delivered from the rotating shaft 38 down to the platform auger 34 to thus cause harvested hay to be moved laterally of the platform toward the inner end 42 thereof. The pickup and platform feeding mechanism is somewhat similar to that shown in the Crumb et al. Patent No. 2,450,082.

An engine 43 is mounted on the X-frame 29–30 and the torque tube 28 in a generally transverse position so that a driving shaft 44 thereof lies transversely to the generally longitudinally extending main frame and parallel with the transversely disposed torque tube 28. The driving shaft 44 of the engine 43 is provided with spaced-apart V-pulleys 45 and 46. Each such pulley is of multiple construction to enable the carrying of a plurality of V-belts thereby. Pillow block bearings 47 and 48 are provided for the extended engine shaft 44 to journally carry the engine shaft and maintain its accurate alignment with the engine 43 and other pelletizer machine elements. The pillow block bearing 48 is mounted on the fabricated beam 19 and the pillow block bearing 47 is mounted on a similar fabricated beam 49. The fabricated beam 49 is substantially identical to the beam 19 and is disposed above the inwardly facing channel member 16 in the same manner as the beam 19 is disposed over the channel member 17. The fabricated beam 19 extends over a greater length in the pelletizing machine because it is employed to carry the packing finger arms to be subsequently described. The beam 49 is foreshortened to permit passage of hay from the receiving platform 33 to the pellet forming chamber 18.

The fabricated beams 19 and 49 provide a support for a transversely disposed shaft 50. The shaft 50 comprises two axially aligned spaced-apart sections 51 and 52 which are journally mounted within bearings 53 and 54 in the fabricated beams 49 and 19, respectively. Each of the shaft sections 51 and 52 is provided with a crank arm 55 and 56, respectively. The crank arms and the shaft section are integrally fastened one to the other. The arms 55 and 56 carry a crankshaft 57 therebetween. The other ends of the arms 55 and 56 are equipped with counterweights 58 and 59 to thereby balance the offset crank driving action. Each shaft portion 51 and 52 carries a large inertial flywheel 60 and 61 at its outer end. Key members 62 and 63 are arranged to lock the flywheels 60 and 61 to their respective shaft sections 51 and 52, respectively. A plurality of V-belts 64 join the multiple V-grooved pulley 45 with the flywheel 60 and similarly a plurality of V-belts 65 join the plural V-belt pulley 46 and the flywheel 61. There are no grooves provided in the outer peripheries of the flywheels 60 and 61 but rather the V-belts ride merely on the surface thereof and are maintained in their path of travel by the grooves in their respective mating pulleys 45 and 46. Obviously, the driving of the hay compressing means by V-belts eliminates the necessity for timing of the two drive mechanisms and acts somewhat in the manner of a slip clutch to aid in the preventing of destruction to the drive elements in the event there is some obstruction to the drive thereof.

The crank arm and crankshaft 57 and its counterweight 58 are best shown in FIGURE 2. A pitman or connecting link 66 is fastened to the crank arm 57 by means of clamp elements 67 and 68. The other end of the pitman 66 is pivotally mounted at 69 to a piston-type element 70 which slides within an enlarged sleeve 71. The forward end of the piston-like element 70 carries a plunger 72 which has an enlarged annular guide flange 73 at the point of connection to the piston-like element 70. The elongated cylindrical plunger portion 74 of the plunger 72 snugly and slidably engages internally of the pellet making cylinder 18. In the maximum extent of the "throw" the annular flange 73 is disposed within the end of the sleeve 71 adjacent the pellet making cylinder 18. In the retracted position of the plunger 72, the annular flange 73 thereof is moved to the rearward end of the sleeve 71 adjacent the flywheels. The pellet forming tube 18 is mounted between spaced walls 75 and 76 as shown in FIGURES 2 and 3. The wall 75 is mounted at 77 to the top surfaces of the channel members 16 and 17, while as shown in FIGURE 3, the wall 76 is fastened to the fabricated beam 19 at 78 and at its other end passes over the fabricated beam 49 and thence extends rearwardly acting as a bearing support as shown at 79 for the transversely disposed driving shaft 38. The longitudinally spaced-apart walls 75 and 76 define the area of feed opening for the delivery of hay from the platform 33 to the pellet forming chamber 18.

As best shown in FIGURE 4, a bracket member 80 is mounted on top of the fabricated beam 19 by an angle member 81 which is bolted as shown at 82 and 83 to the member 19. The bracket member 80 projects upwardly and angularly inwardly toward the platform 33. The bracket 80 includes spaced parallel arms 84 and 85 which are joined to the angle member 81 as shown in FIGURE 3. The spaced arms 84 and 85 at their upper inner end carry a cross shaft 86. The shaft 86 is journaled within the arms 84 and 85 thus permitting a pivotal movement of elements carried thereby. As best shown in FIGURE 4, a rod-like member 87 is slidably mounted through the shaft 86. The rod 87 is provided with a loose collar 88 located on one side of the shaft 86 and a nut 89 mounted on the far side of the shaft 86. The nut 89 is adapted to engage a threaded end portion 90 of the rod 87. The other end of the rod-like member 87 is provided with a block element 91 which is mounted on a shaft 92 which extends to each side of the block member 91 and, as shown in FIGURE 3, carries spaced arm members 93 and 94. The arms 93 and 94 are parallel one to the other and terminate in a longitudinally extending bar member 95. A plurality of packing fingers 96 project outwardly from the bar 95 and as shown in FIGURE 4 are adapted to travel around a path 97 in the direction of the arrow 98. It will be noted that the path of travel of the plurality of packing fingers 96 extends from a position closely adjacent the inner unjournaled end 99 of the auger conveyor 34 down through a sweeping action of the floor 100 of the platform or deck 33 and thence into and through an opening 101 in the side of the tubular cylindrical chamber 18 in which the pellets are formed. The packing fingers 96 constitute elements which are driven by a crank. A crankshaft 102 is journally held by the bar 95 and a capping bar 103 which is fitted over the crankshaft 102 and abuts the lower bar 95 to thereupon provide a suitable bearing for the shaft 102 by the elements 95 and 103. Means (not shown) are provided for holding the elements 95 and 103 in fixed relationship. Crank arms 104 and 105, as shown in FIGURE 3, are mounted in stub shafts 106 and 107, respectively. Each of these stub shafts is journally mounted in one of the walls 75 and 76, respectively, and as best shown in FIGURE 3, the stub shaft 107 is provided on its rearward end with a bevel gear 108 which engages with a complementary bevel gear 109 mounted on and driven by the shaft 38. As the shaft 38 rotates, it causes a driving of the packing fingers 96 and thus a movement of hay or other material fed across the platform 33 by the auger 34 to be delivered into the pellet forming chamber 18. A spring 110 surrounds the rod-like member 87 and is backed up by the collar 88. The shaft 87 is free to slide through shaft 86 when the force on the packing fingers 96 is sufficient to compress the spring 110. The spring constantly urges the packing fingers 96 to move toward a hay feeding position in the direction of the arrow 111 about the shaft 102 as an axis. Thus in the event some obstruction is put in front of the packing fingers 96, such that the obstruction would not or could not yield to the movement of the fingers 96, the fingers 96 would then be free to pivot about the shaft 102 and thus yield against the action of the spring 110. This is merely a safety feature which is built into the packing fingers of this device. A top enclosure 112 is provided over the platform 33 to thus enclose the hay that is fed thereto and act to prevent escape over the top during the feeding of hay from the auger 34 to the pelletizing chamber 18.

As shown in FIGURE 3, a sprocket 113 is provided on the crankshaft portion 52 and by means of a chain 114 rotational drive from the shaft 50 is delivered to a sprocket 115 mounted on the outer end of the cross shaft 38. It will thus be seen that drive is imparted to the shaft 38 for delivering rotational drive to the various mechanisms as previously described. In addition to having support in the bearing member 79 which forms a part of the wall structure 76, the cross shaft 38 is supported in a bearing bracket 116 adjacent the outer side of the pelletizing machine and near the auger carrying arm 36. A still further bearing in the form of a pillow block 117 is provided on the side of the machine above the pelletizing chamber and mounted directly on the fabricated beam 19. This bearing 117 is closely adjacent the sprocket 115.

A V-pulley 118 is mounted on the outer end of the cross shaft 38 beyond the sprocket 115. A V-belt 119 is arranged to engage the pulley 118 and imparts rotational drive forwardly to a V-pulley 120. The V-pulley 120 is mounted on a shaft 121 journaled beneath the frame elements 16 and 17 and carried on brackets (not shown) depending therefrom. A sprocket 122 is mounted on the inner end of the shaft 121 and by means of a chain 123 imparts drive to a spaced-apart sprocket 124 mounted on the pickup cylinder shaft 125. It will thus be seen that as the mechanism is driven the spring fingers 32 of the pickup cylinder 31 are rotatively driven to pick hay up from a windrow or the like and deposit it rearwardly onto the platform 33.

As hay is fed into the pellet forming cylinder 18, it is compressed by the reciprocating plunger 74 to such an extent that the highly compressed hay forms a pellet with each charge of hay that is fed thereto by the plurality of packing fingers 96. These highly compressed hay pellets, if retained in that state for some predetermined short period of time, sufficiently retain their shape even when removed from the cylinder without binder of any form. In other words, the natural juices of the hay form a sufficient binder when it is subjected to very high pressures and the heat of friction with the internal walls of the cylinder 18 causes the surface of the foamed pellets to be baked and have an external crust or glaze formed thereon. This is true even of fairly dry hay and the formed pellets will retain their formed shape without binders or encircling strands.

It is, however, desirable to retain the hay under substantial compression even beyond the point where the pellets are formed and for this purpose a discharge tube 126, as shown in FIGURE 2, is arranged to abut the formation tube 18 and directly and immediately receive the formed pellets 127 therein. The tube 126 is shown in detail in FIGURE 5. The tube 126 is provided with slits 127, 128, 129, and 130 on top, side, bottom and side so that there is formed substantially equal arcuate segments 131, 132, 133 and 134 constituting the cylinder 126. With the cylinder slits a shown and described, the effective diameter of the cylinder may be slightly varied to impose more or less resistance to the passage of pellets therethrough. Spaced-apart clamping members 136 and 137 are provided around spaced-apart positions on the collapsible and expansible tube 126. The detailed construction of these clamping elements 136 and 137 are identical and only the one shown in FIGURE 5 will be described in detail. A first bracket member 138 is provided on the bottom of the tube 126 and is equipped with a V-shaped notch 139 in the top thereof. The tube segments 132 and 133 fit downwardly within the V-notch 139. An upper bracket member 140 is provided with a V-notch 141 in the underside thereof and similarly the segments 131 and 134 of the tube 126 fit within the V-notch 141. Vertically disposed rod members 142 and 143 pass through the bracket members 138 and 140 and are provided at their bottoms with stop nuts 142a and 143a, respectively. These nuts engage threaded end extensions of the rods 142 and 143. The rods are journally slidable within the bracket members 138 and 140 and extend upwardly through a top plate thereof 145 which, as shown in FIGURE 1, extends over the top of both of the clamping elements 136 and 137. Each of the vertical rods 142 and 143 is provided with a forked upper end 146 and 147 and is provided with axially aligned but spaced-apart pins 148 and 149 which pass across the spaced legs 150 and 151 of the clevis or fork 146 and the legs 152 and 153 of the forked end 147. Bell crank members 154 and 155 are mounted on top of the clamping members 136 and 137 and are arranged and constructed to engage the pins of the several forked upper ends of the vertical rods on which the clamping elements are mounted. In order that there be strength, balance and symmetry in the construction, the elements are arranged in pairs. The apex shaft 158 of the bell crank 154 carries the bell crank arms 156 and 156a which respectively engage the forked members 146 and 147 of the vertical rods 142 and 143. The upwardly extending arm 159 of the bell crank 154 is located in the center of the apex shaft 158 and, as shown in FIGURE 1, is pivotally fastened at 160 to the outer bracket 161 of a hydraulic cylinder or the like 162. The other end of the cylinder is provided with a piston rod 163 having a clevis or fastening end element 164 to which the upwardly extending arm 165 of the bell crank 155 is pivotally attached as at 166. A corresponding apex shaft 167 is provided for the bell crank 155 and is of identical construction to that shown for the clamping element 136. Fixed bearing or supporting members 231 and 232 are provided on the top plate 145 to journally receive the apex shaft 158 of the bell crank 154 to thus insure that when the hydraulic cylinder and its piston rod are extended or retracted there is a corresponding rocking movement of the bell cranks 154 and 155 to thereupon close or open the slotted tube 126 to thus impose greater or lesser retriction on the passage of pellets therethrough. When fluid under pressure is admitted to the cylinder 162 by means (not shown), the piston rod 163 is extended therefrom and the spacing between the pivot points 160 and 166 is increased to thus rock the bell cranks 154 and 155. This raises the forked ends 146 and 147 of the rods 142 and 143 to cause the segments 131, 132, 133, and 134 comprising the tubular passage 126 to be pulled together by the clamping members 138 and 140 to thereby restrict the passage of pellets. When, however, the fluid under pressure is removed from the cylinder 162, the piston rod is allowed to retract within the cylinder. This causes the bell cranks 154 and 155 to rotate in the opposite direction and thereby release the segments of the tubular cylinder 126 and relieve the pressure under which the pellets are subjected within the cylinder. The amount of restriction on the tube 126 is determined by the physical condition of the hay necessary to form uniform pellets which will retain their desired shape and size.

The discharge of the pellets from the machine of this invention is at the forward end of the machine as shown at the discharge end 168 of the tube 126. Adjoining the split tube at its forward discharge end 168 is a wagon elevator which comprises another cylindrical tube 169. As shown in FIGURE 1, the tube 169 has a portion 170 abutting the end 168 of the split tube 126 and thence has a rounded or turning portion 171 which comes up over the top and joins with a relatively straight section 172 which projects upwardly and rearwardly over the entire machine to a point of discharge, as shown at 173, over a trailing wagon or the like (not shown) which is pulled by means of a hitch 174 on the rearward end of the frame structure 10 of this device. The tubular member 169 is supported by means of a bracket 175 at the forward end thereof on the inwardly opening channel members 16 and 17 and at its rear end by a bracket 176 projecting upwardly from the frame supporting structure 10 substantially over the hitch point 174 for a trailing vehicle. The purpose of the receiving tube 169 and its forwardly turned portion is to provide for a rearward, elevated, discharge of the formed pellets even though the direction of compression is forwardly of the machine. The tube 169 is substantially the same in diameter as the formation tube 18 and the split tube 126 but slightly larger so that there is not substantial resistance to movement of the pellets therethrough. The movement of pellets through the tube is accomplished merely by the succeeding formation of pellets and the pressing of the one pellet by the other pellet so that the tube is filled with pellets and the formation of the new pellets causes the discharge of previously made pellets from the outer end 173 of this discharging turned tube 169. Thus the power for operating the elevator is gained from the compression of the pellets and may be considered as a free by-product of the pellet manufacture. Even though there is only slight resistance to the hay pellets passing through the elevator tube 169 it is sufficient especially when the turn around is considered when added to the mechanical restriction of the tube 126 to provide for the formation of dense pellets with a shape retaining characteristic.

In the operation of the device of this invention, the machine is pulled through a field of hay to be harvested by a tractor or the like (not shown). Windrowed hay is picked up by the cylinder pickup 31 and its spring fingers 32 deposit the hay on a receiving platform 33. An auger conveyor 34 moves the hay laterally of the platform over the floor 100 thereof and at this point hay is discharged from the unjournaled end 99 of the auger 34 to be picked up by the packing fingers 96 whereupon the hay is swept into and through an opening 101 in the side of the pellet forming tube 18. As shown in FIGURE 4, spring elements 177 are fastened to a floor structure 178 at 179 to retard the breathe-back of the hay that has been pre-compressed into the pellet forming chamber. The packing fingers 96 retract through a top member 181 before the plunger 74 has completely crossed the feed opening. These spring elements thus perform the function of retaining this pre-compressed hay in the pellet forming chamber until it is compressed by the plunger. The floor 178 joins the floor 100 of the platform deck with the tube 18 and there is an abutting relationship between the floor 178 and the opening 101 in the tube 18. A bracket member 180 is fastened to the underside of the tube 18 and the underside of the floor 178 to insure its support. The top member 181 is provided from the top wall 112 of the platform to insure the guidance of hay to the side opening 101 in the pellet forming chamber 18. Here again, a bracket member 182 is provided on top of the cylinder 18 and engages the guiding top wall 181 as the bracket member 180 engages the underside thereof. As the engine 43 operates, the reciprocating plunger 74 is operated to compress the charges of hay as they are fed into the opening 101. Each such charge forms a pellet 127. The natural juices within the hay tend to come to the surface of the formed pellets where they are effectively baked by the frictional heat created by the pellets moving through the forming chamber. This makes the pellets have a hard, crusty surface. As the pellets are formed in the chamber 18, they are thence delivered to the axially aligned and adjoining split chamber 126. This split tube 126 is provided with an annular flange 183 which abuts an annular flange 184 of the formation tube 18 to which the adjoining flanges may be attached by bolting or other means and thereupon pellets 127 may move from one tube to the next without hindrance. The wall 75 is sandwiched between the abutting flanges 183 and 184. The split portion of the tube 126 may be restricted or not as desired by operation of the fluid cylinder 162 and its piston rod 163. As the cylinder and piston rod expand, the tube 126 is restricted and when the piston rod is withdrawn within the cylinder, the split tube 126 is permitted to expand thus relieving the pressure on the pellets formed therein. It has been found through operation that the pellets after formation should be constrained to their formed shape for a short period of time to insure their continued retention of that shape when they are finally discharged to a trailing wagon or other depository. Following the split tube passage 126 the pellets are forced into the discharging tube 169 which has a reversing curve therein to cause the pellets to reverse their direction of movement rearwardly over the top of the various elements for deposit into a trailing wagon or the like.

Numerous details of construction may be varied throughout a wide range without departing from the principles disclosed herein and we therefore do not propose limiting the patent granted hereon otherwise than as indicated by the appended claims.

What is claimed is:

1. A field traversing hay pellet forming machine, comprising: a frame supporting structure disposed in a generally fore-and-aft longitudinal direction, a wheel supporting truck adjacent the rear of said frame supporting structure, a cylindrical pellet forming tube extending in a longitudinal direction and in a horizontal plane and mounted on said frame supporting structure, a hay inlet in the side of said tube, means on said machine for feeding hay into the side of said pellet forming tube, a plunger arranged and constructed to reciprocate within said tube and starting from the rearward end thereof and moving on its compression stroke forwardly past said position where hay is fed into the side of said tube, whereby hay pellets are formed in said pellet forming tube, split tube means for imposing a variable resistance on hay in said pellet-forming tube in communication with said pellet-forming tube, discharge tube means for glazing and curing said hay pellets in communication with said split tube means, a power supplying engine mounted over said wheel truck at the rear end of the frame supporting structure, flywheel means mounted on said frame supporting structure over said wheel truck and positioned adjacent to said power supplying engine, means driving said flywheel means by said power supplying engine, and crank means joining said flywheel means and said plunger for reciprocatively driving said plunger in a fore-and-aft longitudinal direction and arranged to extrude hay pellets forwardly from said pellet forming tube.

2. The invention according to claim 1, including means mounted on said frame supporting structure for adjustably restricting said split tube means.

3. The invention according to claim 1, including means mounted on said frame supporting structure for adjustably restricting said split tube means, said means adjustably restricting said split tube means comprising spaced-apart clamp means thereon, linkage means associated with each of the clamp means, and expandable and contractible means extending between each of said linkage means.

4. The invention according to claim 1, including means mounted on said frame supporting structure for adjustably restricting said split tube means, said means adjustably restricting said split tube means comprising spaced-apart clamp means thereon, linkage means associated with each of the clamp means, and expandable and contractible means extending between each of said linkage means, said expandable and contractible means including a hydraulic cylinder and cooperating piston means.

5. The invention according to claim 1, including means mounted on said frame supporting structure for adjustably restricting said split tube means, said means adjustably restricting said split tube means comprising spaced-apart clamp means thereon, linkage means associated with each of the clamp means, and expandable and contractible means extending between each of said linkage means, each of said linkage means including a bell crank lever having one arm thereof engaging the clamp means and the other arm thereof engaging the expandable and contractible means.

6. A field traversing hay pellet making machine, comprising: a frame structure, a wheel support for said frame structure disposed generally at the rear thereof, a pellet forming tube means carried on said frame structure and extending forwardly of the wheel support, said pellet forming tube means having an opening therein, means feeding hay to said opening in the pellet forming tube means, compressing plunger means for said hay within said tube means, and means for reciprocally driving said compressing plunger means mounted on said frame structure over said wheel support, said pellet forming tube means communicating at the discharge thereof with a variable resistance split discharge tube means and elevator tube means of slightly larger internal size than the pellet forming tube means, and said elevator tube means extending forwardly and then curving upwardly and thence rearwardly and upwardly to provide a shape-retaining frictional resistance and a rear discharge path for the formed pellet.

7. A field traversing hay pellet making machine, comprising: a frame structure, a wheel support for said frame structure disposed generally at the rear thereof, a pellet forming tube means carried on said frame structure, said pellet forming tube means having an opening therein, means feeding hay to said opening in the pellet forming tube means, compressing plunger means for said hay within said tube means, and means reciprocally receiving said compressing plunger means mounted on said frame structure over said wheel support, said pellet forming tube means communicating at the discharge end thereof with a variable resistance discharge tube means and a forwardly extending discharge means for glazing and curing said hay pellets, said last-named means defining a tubular portion bending over itself in a circuitous path and reversing the direction of movement of the hay pellets to provide a zone of frictional resistance to the discharge of the hay pellets.

8. The invention according to claim 1, wherein said power supplying engine has a transversely disposed drive shaft, spaced-apart V-belt pulleys mounted on said drive shaft, said flywheel means comprising spaced-apart flywheels journally mounted on said frame supporting structure in planar alignment with each of said plural V-belt pulleys, V-belts mounted in said plural V-belt pulleys and extending around each of said flywheels for imparting drive thereto, said crank means including each of said flywheels having an arm driven by and spaced inwardly thereof, said arms disposed parallel to each other and in axial alignment, and a crankshaft carried by the outer ends of said arms, and pitman means joining said crankshaft and said plunger to effect reciprocation thereof.

9. The invention according to claim 8, wherein each of said arms is provided with a weight at its end opposite the crankshaft, whereby the motion thereof is substantially balanced.

10. A hay pellet forming machine, comprising: a frame supporting structure, a pellet forming tube means, means for supplying hay to said pellet-forming tube mounted on said frame supporting structure, means carried on said frame supporting structure and arranged and constructed to move hay into said pellet forming tube means, a reciprocating plunger arranged and constructed to slidably engage longitudinally of said pellet forming tube means and compress the hay fed thereinto, an apertured tube joined to the discharge of said pellet forming tube means, means operably associated with the apertured tube and operable to expand and contract the tube about its axis, and discharge means for glazing and curing said hay pellets, said discharge means defining a tubular portion imposing frictional resistance on the movement of hay through said pellet-forming machine, and forming a continuation of said apertured tube.

11. A hay pellet forming machine, comprising: a frame supporting structure, a pellet forming tube means, means carried on said frame supporting structure and arranged and constructed to move hay into said pellet forming tube means, a reciprocating plunger arranged and constructed to slidably engage longitudinally of said pellet forming tube and compress the hay fed thereinto, an apertured tube joined to the discharge of said pellet forming tube means, and means operably associated with the aperture tube and operable to expand and contract the tube about its axis, said pellet forming tube means including discharge means for glazing and curing said hay pellets with the juices thereof defining a tubular portion extending from said apertured tube discharge and curving back on itself in a circuitous path and providing a pellet discharge restriction.

12. A hay pellet forming machine, comprising: a frame supporting structure, a pellet forming tube mounted on said frame supporting structure, means carried on said frame supporting structure and arranged and constructed to move the hay into said pellet forming tube, a reciprocating plunger arranged and constructed to slidably engage longitudinally of said pellet forming tube and compress the hay thereinto, a split tube adjoining said pellet forming tube and mounted on said frame supporting structure and comprising a plurality of arcuate segments arranged in shape of a tubular element, clamp means spaced about the split tube and moving the arcuate segments selectively toward and away from each other attendant to selective expansion and contraction of the split tube and discharge means for glazing and curing said hay pellets, said discharge means defining a tubular extension of said split tube and imposing a frictional resistance on the movement of hay through said pellet-forming machine.

13. The invention according to claim 12, wherein said clamp means includes a pair of clamp elements each at opposite ends of the split tube and each having bell crank lever means operable upon the clamp means in expansion and contraction of the split tube.

14. A hay pellet forming machine, comprising: a frame supporting structure, a pellet forming tube means mounted on said frame supporting structure, means carried on said frame supporting structure and arranged and constructed to move hay into said pellet forming tube means, a reciprocating plunger arranged and constructed to slidably engage longitudinally of said pellet forming tube means and compress the hay fed thereinto, said pellet forming tube having a split tube portion, and means adjustably restricting said split tube including longitudinally spaced-apart clamp means, said means adjustably restricting said split tube having a linkage associated with each of said clamp means, bell crank lever means mounted on said linkage and having arm means arranged to directly control said clamp means, expandable and contractible means joining the arm means, whereby the clamp means may be simultaneously adjusted, and discharge means for glazing and curing said hay pellets, said discharge means defining a tubular extension of said split tube portion imposing frictional resistance on the movement of hay through said pellet-forming machine.

15. A field traversing hay pellet making machine, comprising: a frame structure, a wheel support for said frame structure disposed generally at the rear thereof, a pellet forming tube means carried on said frame structure and extending forwardly of the wheel support, said pellet forming tube means having an opening therein, means feeding hay to said opening in the pellet forming tube means, compressing plunger means for said hay in said tube means and providing a forward moving force, and means reciprocally driving said compressing plunger means mounted on said frame structure over said wheel support and including means balancing the effect of the forward moving force, variable resistance split tube means for compacting hay pellets communicating with the discharge of said pellet forming tube, and discharge tube means for glazing and curing said hay pellets, said discharge means defining a tubular portion communicating with said split tube and imposing a frictional resistance on the movement of hay through said pellet-forming machine.

References Cited by the Examiner
UNITED STATES PATENTS

| | | | |
|---|---|---|---|
| 649,413 | 5/00 | Luzzatto | 100—98 |
| 657,607 | 9/00 | Luzatto | 100—74 |
| 704,698 | 7/02 | Edison | 44—10 |
| 751,752 | 2/04 | Pilliod | 100—185 |
| 1,394,458 | 10/21 | Whitney | 100—192 |
| 1,490,162 | 4/24 | Dow | 100—93 |
| 2,296,516 | 9/42 | Goss | 18—5 |
| 2,450,082 | 9/48 | Crumb et al. | 56—343 |
| 2,536,387 | 1/51 | Mulvany | 99—8 |
| 2,651,269 | 9/53 | French. | |
| 2,716,318 | 8/55 | Skromme | 56—1 |
| 2,833,633 | 5/58 | Hecht | 44—13 |
| 2,942,976 | 6/60 | Kosch | 99—8 |

FOREIGN PATENTS

| | | |
|---|---|---|
| 534,774 | 12/56 | Canada. |
| 21,173 | 10/99 | Great Britain. |

WALTER A. SCHEEL, *Primary Examiner.*

ABRAHAM G. STONE, *Examiner.*